United States Patent [19]

Ricciardi

[11] 4,077,612

[45] Mar. 7, 1978

[54] METERING AND WETTING SYSTEM

[76] Inventor: Ronald J. Ricciardi, 108 Malcolm Ave., Garfield, N.J. 07026

[21] Appl. No.: 730,326

[22] Filed: Oct. 7, 1976

Related U.S. Application Data

[63] Continuation-in-part of Ser. No. 421,668, Dec. 4, 1973, abandoned.

[51] Int. Cl.² .................. B01D 47/00; B67D 5/54; B01F 15/00
[52] U.S. Cl. .................................. 366/102; 55/233; 222/193; 366/165
[58] Field of Search .............. 259/4 R, 151; 222/193; 55/233, 257, 90

[56] References Cited

U.S. PATENT DOCUMENTS

| | | | |
|---|---|---|---|
| 2,653,801 | 9/1953 | Fontein et al. | 259/4 R |
| 3,186,602 | 6/1965 | Ricciardi | 198/64 |
| 3,212,757 | 10/1965 | Martin et al. | 259/4 R |
| 3,237,865 | 3/1966 | Kovach | 259/151 |
| 3,348,825 | 10/1967 | McIlvaine | 55/257 |
| 3,779,519 | 12/1973 | Anderson et al. | 259/151 |
| 3,794,299 | 2/1974 | Wagner et al. | 259/4 R |

*Primary Examiner*—Steven L. Stephan
*Attorney, Agent, or Firm*—Edwin T. Grimes

[57] ABSTRACT

A metering and wetting system for polyelectrolyte, dry powders or the like, characterized by a volumetric feeder, a pressurized pneumatic system for atomizing the dry polyelectrolyte received from the volumetric feeder, an air dryer assembly for removing moisture from the air supplied to said pneumatic system, a mixing-wetting chamber for wetting substantially all of the atomized particles of polyelectrolyte, and a mixing tank for agitating and aging the so-called polyelectrolyte to transfer same into solution with the aid of mechanical agitation and, according to one aspect of the invention, a scrubber assembly mounted on the top of the mixing tank.

24 Claims, 9 Drawing Figures

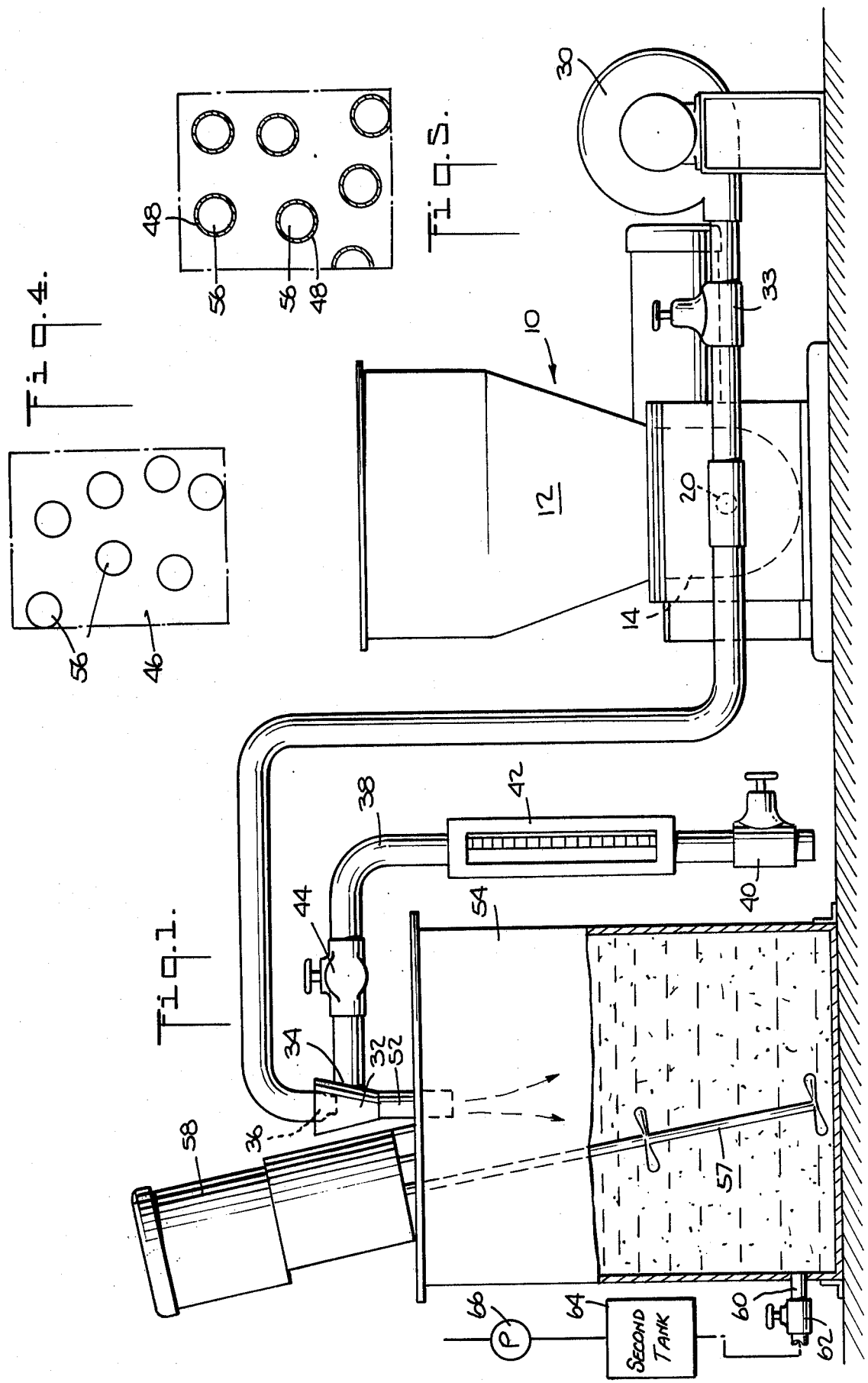

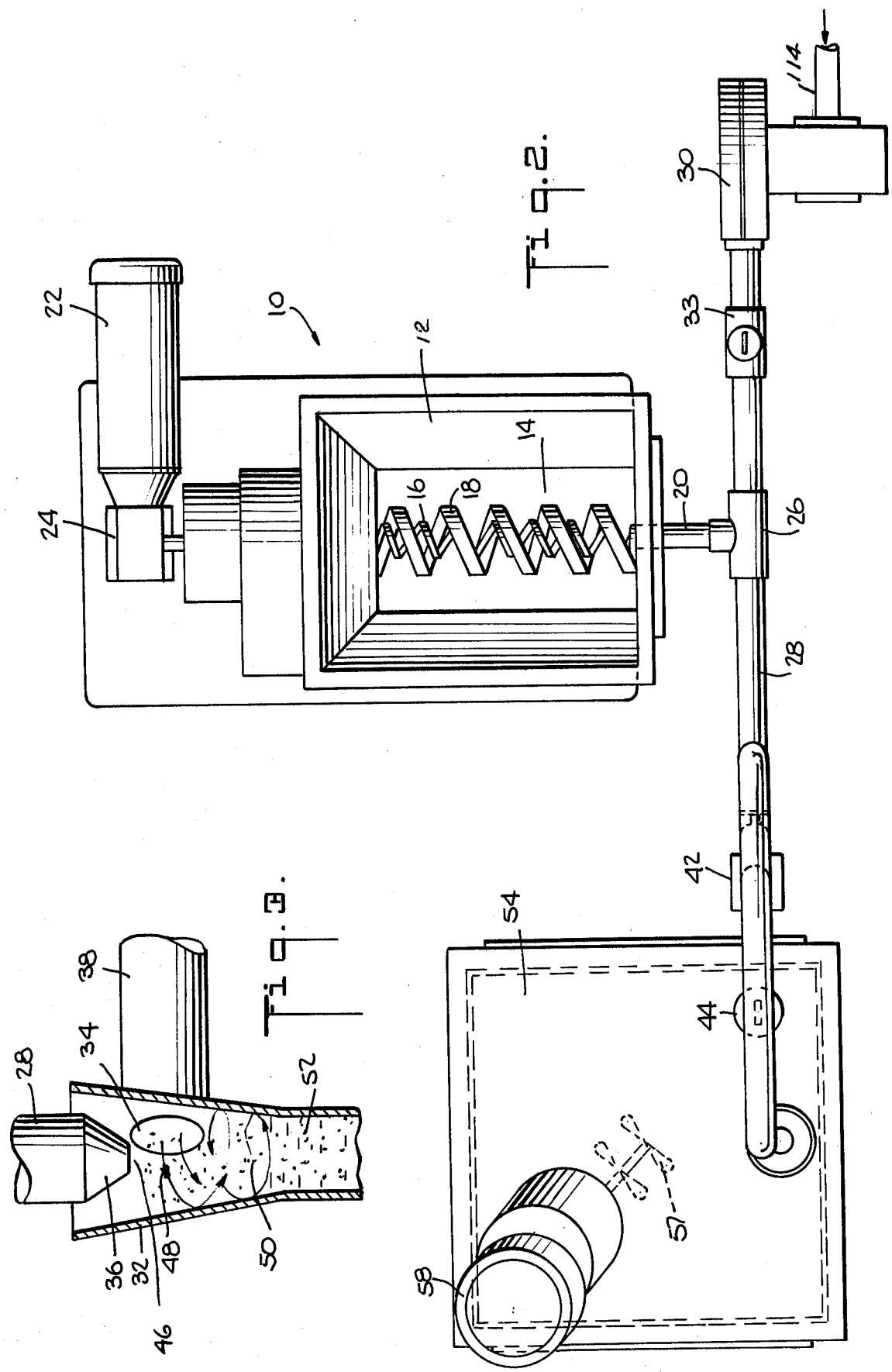

METERING AND WETTING SYSTEM

This application is a continuation-in-part of my co-pending application Ser. No. 421,668 filed Dec. 4, 1973 entitled "Metering and Wetting System" (now abandoned).

This invention relates to metering and wetting systems, for dry powders and is particularly adapted, inter alia, for wetting polyelectrolytes, or the like, which are basically coagulation aids used in such processes as waste water treatment, for example. The polyelectrolyte is actually a polymer which has recently been introduced as an extremely effective means of coagulation. It replaces certain other chemicals which have been used for many years, such as alum, for example. The main advantage of polyelectrolytes is that an extremely small quantity of this polymer will accomplish what used to take many hundreds of times the quantity of other chemicals used for coagulation.

A particular problem occurs in the handling of polyelectrolyte, which is due to its inherent hygroscopic nature and the difficulties involved in properly wetting the polymer and bringing it into solution. Such polymers vary from about 10 to about 50 minutes to "age" after it has been properly wetted, to transfer into solution. It would appear as though a very simple method of wetting the polyelectrolyte would be to meter the polymer directly into a tank and mix it with a mixer. However, the problem involved with wetting a polyelectrolyte, or the like, is one created by its extremely hygroscopic nature. If, for example, one took a handful of polyelectrolyte and dumped it into a bucket of water, the outer portion of this clump would wet instantaneously upon contact with the water, preventing the center core of the lump from being wetted. The wetted outer area then becomes a viscous shell and will actually isolate the still dry encapsulated powder. In fact, it is very difficult to penetrate the outer wetted shell in an effort to try and wet the dry powder encapsulated therein. These unwetted particles or globules are generally known, in the trade, as "fisheyes." Mechanical mixers are also employed, but have difficulty in breaking down these lumps, particularly within the allocated period of time required for the aging process or within allocated process time requirements.

Thus, it is essential that every grain of polyelectrolyte be wetted in order for a metering/wetting polymer system to be completely functional.

In addition, once unwetted particles are created and exist, the fact that they are very difficult to dissolve and break up is only part of the problem. Another serious problem resides in the extremely adhesive nature of improperly wetted polymer. The unwetted or partially wetted polyelectrolyte globules will adhere to practically any surface to which it comes in contact. Therefore, it is easy to realize that in transporting a polyelectrolyte solution which contains unwetted or partially wetted particles, there is a tendency for these particles to agglomerate and adhere to themselves and to the inside of the pipes, which creates a serious problem. Thus, in operation, if a polyelectrolyte solution containing these unwanted particles is permitted to pass through pipe lines, pumps, etc., clogging will undoubtedly result in a very short period of time, rendering the system useless. On the other hand, a properly wetted polyelectrolyte solution does not cause any handling problems per se.

Applicant has discovered a novel combination of elements combined in such a way as to afford a very economical, efficient and practical solution of the difficulties and the problems above discussed, as will become apparent as the description proceeds. Related patents in this art include U.S. Pat. Nos. 3,118,459 issued Jan. 21, 1964; 3,251,550 issued May 17, 1966; 1,770,011 issued July 8, 1930; 3,003,751 issued Oct. 10, 1961; 3,351,979 issued Nov. 14, 1967; 3,386,182 issued June 4, 1968; and 2,953,359 issued Sept. 20, 1960.

Briefly, my invention contemplates the provision of a new and improved metering and wetting system characterized by a volumetric feeder for receiving powdered polyelectrolyte and supplying metered, conditioned polyelectrolyte to apparatus for atomizing the polyelectrolyte. The so atomized polyelectrolyte is passed to a mixing-wetting chamber wherein substantially all of the atomized particles of polyelectrolyte are wetted and thence transferred to a mixing tank for aging. After aging the solution of polyelectrolyte is then ready for use in industry.

In accordance with one aspect of the invention, the apparatus for atomizing the polyelectrolyte is in the form of a "tee" which is mounted in a pneumatic conveying line. One branch of the tee receives the powdered polyelectrolyte from the outlet of the volumetric feeder and another leg of the tee receives a controlled quantity of compressed air which intermixes with the powdered polyelectrolyte in the tee and in the pneumatic line extending from the third leg of the tee to thereby completely atomize the polyelectrolyte and convey it to the mixing-wetting chamber. An air dryer assembly is provided for removing moisture from the air supplied to the pneumatic system. This air dryer assembly includes two desiccant chambers each containing a supply of regenerable beaded desiccant material and a heating element, and each of the chambers has an opening to the atmosphere. The system further includes valve means for connecting, in one mode of operation, the first chamber to the pneumatic system and the second chamber to a blower, and for connecting in a second mode of operation the second chamber to the pneumatic system and the first chamber to the blower. Control means are provided for controlling the mode of operation of the valve means in preselected timed sequence, whereby when one desiccant chamber is being utilized the other is being regenerated.

According to another aspect of my invention, the mixing-wetting chamber is conical in shape and vertically mounted with the so atomized polyelectrolyte entering at the top thereof and a controlled quantity of water entering tangentially through an inlet disposed at about 90° with respect to the atomized powder inlet. The top of the wetting chamber is open. The flow of water is carefully controlled and a selected volume of air is employed to create a positive turbulent wetting action as the water and air combine whereby the atomized polyelectrolyte particles are completely wetted and passed through with the water to a lower outlet of the mixing-wetting chamber. The mixing-wetting chamber is so constructed that all internal surfaces are flooded with water to limit any possibility of polymer adhesion and to provide the optimum percentage of air to water to polymer relationship without flooding, clogging, or improper wetting.

According to another aspect of the invention, there is provided a scrubber assembly mounted on top of the mixing tank, which is characterized by a cylindrical housing having a blower mounted on the upper periphery thereof and a plurality of staggered baffle plates mounted on the internal walls. An inlet pipe extends from the middle of the bottom of the housing a short distance down into the mixing tank. A screen covers the bottom of the inlet pipe and a pair of tangentially oriented water inlet pipes are mounted above the screen to form a water blanket on the screen, thereby providing a negative air draw through the wetting chamber to eliminate dust at this point, assisting in the inward draw of polymer and water into the mixing tank and preventing polymer dust from adhering to the internal areas of the mixing tank.

According to still another aspect of my invention, the mixing tank which receives the so wetted polyelectrolyte particles from the mixing-wetting chamber is provided with a mechanical mixer for mechanically agitating the polyelectrolyte and to assist with the complete transfer of same into solution. The foregoing process cycle may operate continuously for as long as required.

There has thus been outlined rather broadly the more important features of the invention in order that the detailed description thereof that follows may be better understood, and in order that the present contribution to the art better appreciated. There are, of course, additional features of the invention that will be described more fully hereinafter. Those skilled in the art will appreciate that the conception on which this disclosure is based can readily be utilized as the basis for the designing of other structures for carrying out the several purposes of the invention. It is important, therefore, that this disclosure be regarded as including such equivalent constructions as do not depart from the spirit and scope of the invention.

Several embodiments of the invention have been chosen for purposes of illustration and description, and are shown in the accompanying drawings, forming a part of the specification, wherein:

FIG. 1 is a side elevation, partially in section, of a system for metering and wetting polyelectrolyte, constructed according to the concepts of my invention;

FIG. 2 is a plan view of the system of FIG. 1;

FIG. 3 is an enlarged, medial, vertical, sectional view of a mixing and wetting chamber of the system;

FIG. 4 is a greatly enlarged view showing particles of polyelectrolyte prior to being wetted;

FIG. 5 is a view similar to FIG. 4, but showing the particles after being wetted;

Figure 6:
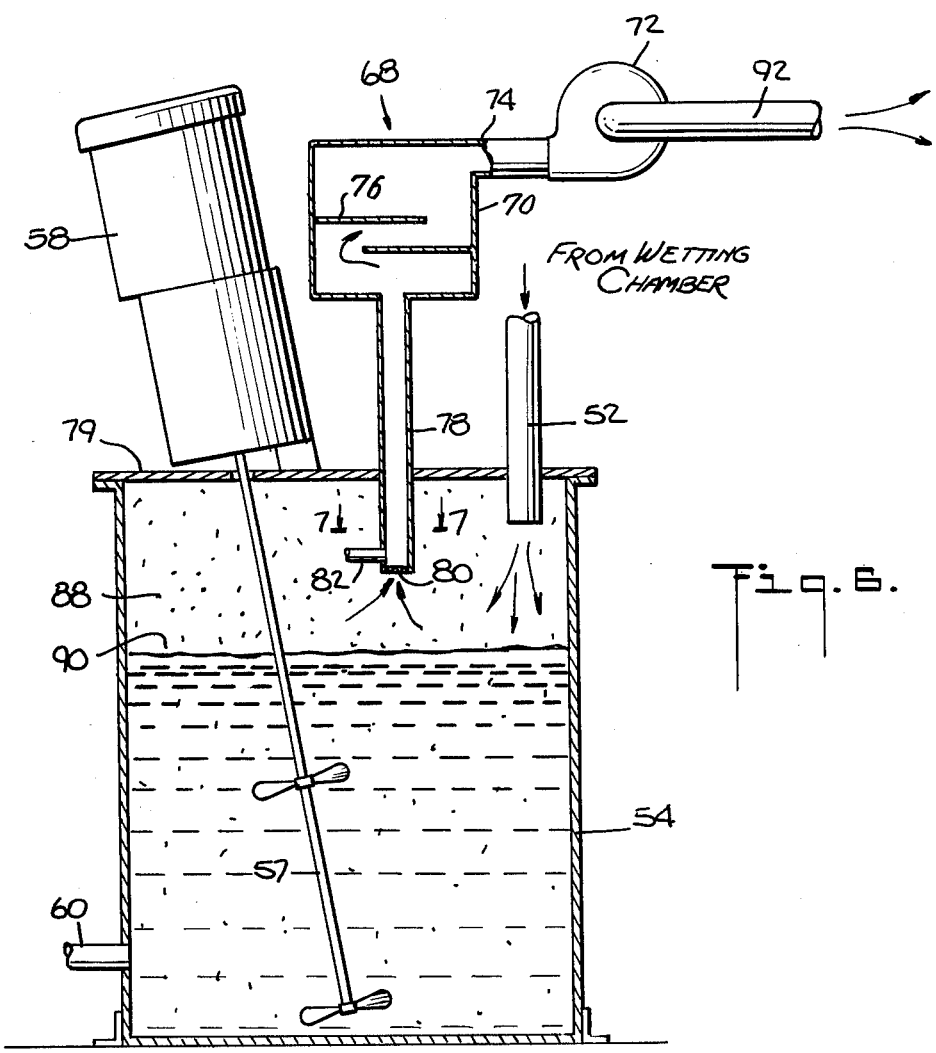
FIG. 6 is a side elevation, partially in section, of a system for metering and wetting polyelectrolyte including an air scrubber, constructed according to the concepts of my invention.

In the embodiment of the invention illustrated in FIGS. 1 to 5, the system for metering and wetting polyelectrolytes comprises a volumetric feeder indicated generally at 10, such as the one described in my U.S. Pat. No. 3,186,602, for example, which includes a bin 12 for receiving powdered polyelectrolyte or the like to be processed, and which feeds into a conditioning chamber 14 containing a pair of concentric augers 16 and 18, FIG. 2, which condition and meter a predetermined volume of material out through a discharge conduit 20.

An electric motor 22 serves to drive the augers through a variable speed or constant speed drive 24.

The discharge of the volumetric feeder meters the polymer into a "tee" 26, FIG. 2, which is located in a pneumatic conveying line 28. Either compressed air or a blower unit 30 moves air through the line to atomize the powdered polyelectrolyte and convey it to a mixing-wetting chamber 32. A valve 33 serves to control the flow of air, as will be described more fully hereinafter.

As indicated hereinbefore, the metering and wetting system of the present invention is particularly directed to processing polyelectrolyte, which is very hygroscopic in nature and, as a consequence, if the surfaces of the system become wet the atomized polyelectrolyte will adhere to these surfaces. Therefore, it is important that the air supplied by the blower unit 30 be substantially moisture free. FIG. 9 shows an air dryer assembly according to the invention, which comprises two desiccant chambers 94 and 96 each containing a supply of regenerable beaded desiccant material. A four-way shuttle valve 98 is included as an integral part of the dryer assembly to direct the air flow through the selected desiccant chamber, as only one chamber is utilized at any given time, while the chamber not in use is having its desiccant material regenerated. To regenerate the desiccant, the chambers 94 and 96 are equipped with heating elements 100 and 102, respectively, which are used to dry the saturated desiccant on a programmable, timed basis. In addition, a small blower 104 is employed to assist in the drying process.

In operation, the four-way valve 98 is automatically positioned by an electric actuator 106, which selects the desiccant chamber for use in the system while the other chamber is available for regeneration. For example, in one mode of operation, air is drawn from the atmosphere through a filter 108, through a line 110, through the desiccant material in chamber 96, through line 112, through the four-way valve 98, and through a conveying line 114 to the blower unit 30. During the period that chamber 96 is being utilized for drying the system air, the desiccant in the second chamber 94 is being regenerated. During the regeneration cycle, air is forced by the blower 104 through pipe 116, the four-way valve 98, a line 118, over the heater 100 and through the chamber 94, through a line 120, and discharges through a filter 122 to the atmosphere.

The duration of the regenerative cycle is programmed depending upon the time required to regenerate the particular desiccant material. When the desiccant in the first chamber 96 becomes saturated the four-way valve 98 is switched so that the assembly changes to its second mode of operation wherein the system air passes sequentially through the filter 122, the line 120, the chamber 94, the line 118, the four-way valve 98, and through the line 114 to the blower unit 30. At the same time the desiccant material in the chamber is being regenerated by sequentially passing the air from the small blower 104 through the line 116, the four-way valve 98, the line 112, the chamber 96, over the heater 102, and through the line 110 and filter 108 to the atmosphere.

As a result, the air dryer assembly removes in excess of ninety-nine percent of the moisture in the air before the air enters the blower unit 30 and conveying lines, thereby preventing moisture from prematurely contacting the dry polyelectrolyte.

As best seen in FIGS. 1 and 3, the mixing-wetting chamber is mounted vertically, and is of conical configuration, with a water inlet 34 entering tangentially at about 90° with respect to an atomized product nozzle-like inlet 36. As the air carrying the polymer is forced into the mixing-wetting chamber 32 under a few pounds of pressure, a cyclonic turbulence is created as the air comes into contact with the flowing water and the tapered portion of the mixing-wetting portion. This turbulence generates thorough mixing action. Water is supplied through an inlet pipe 38 containing a valve 40, flow meter 42 and a second valve 44 for accurately controlling the flow therethrough. Thus, as seen in FIG. 3, atomized product 46 vertically enters the mixing-wetting chamber while water 48 enters the chamber horizontally. With this cyclonic mixing-wetting chamber, as indicated at 50, basically each and every particle of the polymer is thoroughly wetted and thence dispensed through an outlet pipe 52 extending a short distance, such as about six inches for examples, down into a mixing or aging tank 54 mounted thereunder. As shown in FIG. 4, the particles of polymer 56 arrive at the mixing-wetting chamber inlet as an atomized product 46 and when they leave the chamber each particle of the polymer is thoroughly wetted by the water 48, as shown in FIG. 5. It will be appreciated that the mixing-wetting chamber 32 is so constructed that all internal surfaces are flooded with water to eliminate any possibility of polymer adhesion and to provide the optimum percentage of air to water to polymer relationship without flooding, clogging or improper wetting. The volume of air is so controlled, by valve 33 that it passes through without back pressure, thus providing a wetting action whereby the atomized polyelectrolyte particles are completely wetted in a cyclonic fashion and passed through with the water to the mixing tank 54 therebelow.

As best seen in FIG. 1, the mixing tank 54 is provided with a mechanical mixer 57 powered by an electric motor 58. The purpose of the mixing tank is to provide mechanical assistance through positive mechanical agitation and to provide sufficient time for the aging process, which may take from about 10 to about 50 minutes, usually about 15 to about 20 minutes, depending on the particular polyelectrolyte to completely transfer into solution. However, it is important that, as the material enters this mixing or aging tank, the solution is continuously mechanically agitated during this aging period. Once this has been completed, the material may remain in the tank for a number of hours without any difficulty, such as up to about 48 hours, for example. The mixing tank is provided with an outlet pipe 60 and an outlet valve 62. A second similar or holding tank 64 may be mounted adjacent to or underneath said mixing tank and is provided for receiving all of the contents of the first mixing tank 54 after the polymer has gone into solution. A pump 66 is utilized to draw the polyelectrolyte solution from the second mixing tank 64 and introduce it into the process wherein the polyelectrolyte is being used as a coagulate. The foregoing process cycle is continuous for as long as required. Since the system operates basically on a batch basis, the solution is normally only prepared on demand, the demand being the amount used in the water purification process. Accordingly, a second or holding tank is employed so that, after the polyelectrolyte solution is complete, it is automatically discharged into the holding tank, once the level in the holding tank is low enough to permit the entire contents of the mixing tank to be dumped. The polyelectrolyte solution is then pumped into the process from the holding tank. As will be appreciated, the mixing or aging tank is the preparation tank for the solution, and the frequency of this cycle is based on the process usage of the solution, as drawn off from the holding tank. For example, if the usage is very small, it may be necessary to prepare only one solution per day, or perhaps even longer.

Figure 8:
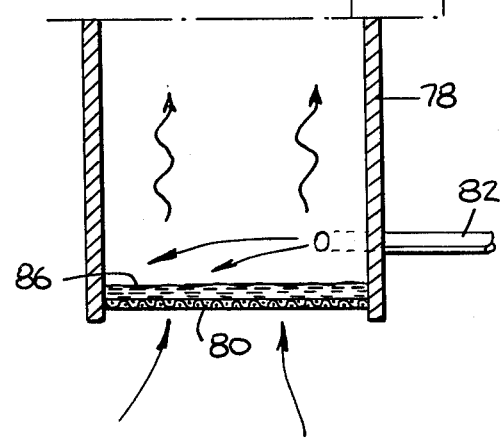
FIG. 8 is an enlarged, medial sectional view of the lower portion of the air scrubber shown in FIG. 6.
Figure 9:
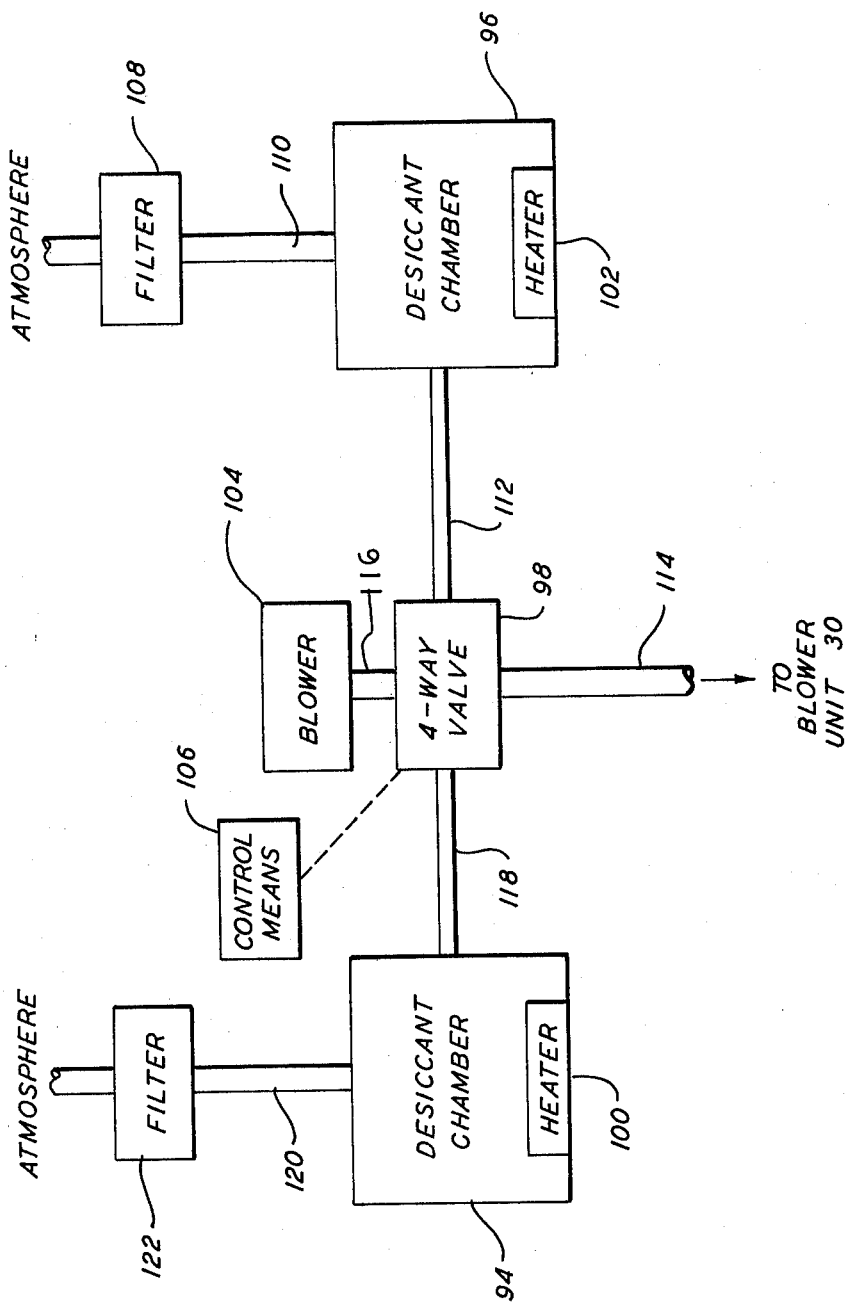
FIG. 9 is a schematic representation of an air dryer assembly according to the invention.

In order to provide for the complete wetting of all polymers, if a small percentage thereof does happen to escape the initial wetting process, and to further eliminate the escape of loose unwetted particles of polymer into the mixing tank, which would adhere to the internal surfaces thereof, the system as illustrated in FIGS. 6 and 8 is equipped with a scrubber assembly, as indicated generally at 68, which draws the majority of its air supply through the wetting chamber.

This scrubber assembly serves multiple purposes; firstly, it provides a negative air draw through the wetting chamber thereby eliminating dust at this point; secondly, the scrubber aids in the effectiveness of the mixing function in the wetting chamber by providing inward draw of polymer and water; and thirdly, the scrubber maintains a slight draw in the mixing tank thereby eliminating the possibility of unwetted polymer dust blowing about and/or adhering to the internal areas. In operation, the scrubber assembly draws unwetted particles of polymer therethrough which, in turn, results in the complete wetting of any remaining particles of powder.

Figure 7:
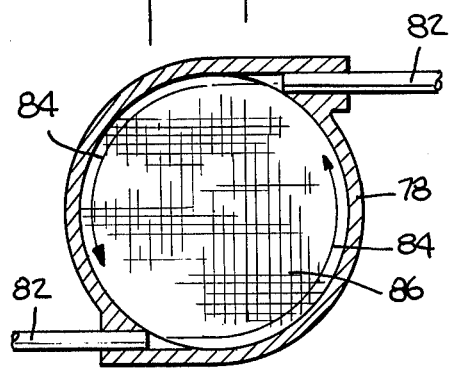
FIG. 7 is an enlarged sectional view taken along the line indicated at 7—7 in FIG. 6.

The scrubber assembly, as seen in FIG. 6, comprises a housing 70 having blower suction on the upper periphery thereof, as at 74, and a plurality of staggered baffle plates 76 are mounted on the internal walls. An inlet pipe 78 extends from the bottom of the housing 70 downwardly through a cover 79, and thence a short distance, of the order of about six inches, downwardly into the mixing tank 54. As seen in FIG. 8, the screen 80, having a mesh size of the order of about one-thirty second inch, completely covers the bottom of the scrubber inlet pipe 78. Water, under pressure, supplied from any convenient source, enters the scrubber assembly through a pair of tangentially oriented inlet pipes 82 located a short distance above the screen 80 with a generally centrifugal motion, as indicated by the arrows 84 in FIG. 7. The screen serves to form a water blanket 86 thereabove, as best seen in FIG. 8. It is noted that the pipes 52 and 78 terminate in an upper portion 88 above the surface of the solution of polyelectrolyte in the mixing tank 54.

In operation, the blower 72 draws air and any unwetted polymer contained therein from the wetting chamber, through the pipe 52 and from the upper portion 88 of the mixing tank 54. This air is drawn up through the water covered screen 80 and any unwetted particles of polymer are effectively trapped, wetted, and dropped into the mixing tank. The air is then drawn up through the cylindrical housing 70 through the baffle arrangement 76, where the moisture contained therein is removed, and then out through the blower 72 and discharged from the outlet 92 into the atmosphere. Thus, the discharge from the blower is only clean air.

Tests indicate that when processing certain types of polyelectrolyte, the quantity of unwetted polymer passing through the wetting chamber may vary up to a maximum of about 1.5%. This percentage is completely dependent upon the mesh or particle size of the polymer, which is reflected in its ability to atomize. The larger the particle size, the higher the wetting percentage and the lower the amount of unwetted polymer. The scrubber, however, does provide for 100% wetting by trapping and wetting any remaining polymer material which escapes the initial wetting process. Thus, the scrubber serves to draw air through the system thereby restricting the escape of dust contained therein and preventing buildup of particles of polymer on the bottom of the cover 79 and on the walls of the upper portion 88 of the mixing tank 54.

It will thus be seen that the present invention does indeed provide an improved metering and wetting system which is superior in simplicity, operability, reliability and efficiency as compared to prior art such devices. The combination of the air dryer assembly, the feeder-atomizing portion, the wetting chamber portion and the scrubber portion cooperates to provide a complete self-cleaning and very effective polymer metering and wetting system.

Although particular embodiments of the invention are herein disclosed for pusposes of explanation, various modification thereof, after study of the specification will be apparent to those skilled in the art to which the invention pertains.

What is claimed and desired to be secured by letters patent is:

1. A metering and wetting system for polyelectrolyte or the like comprising, in combination, volumetric feeder means for receiving powdered polyelectrolyte and conditioning and metering same, means for supplying a controlled quantity of compressed air, an air dryer assembly for predrying said compressed air, means for atomizing said powdered polyelectrolyte from said feeder means with said compressed air, means for supplying a controlled quantity of water, a mixing-wetting chamber for receiving said atomized powdered polyelectrolyte and said controlled quantity of water and wetting substantially all of the atomized particles of polyelectrolyte, and a mixing tank for receiving said so wetted polyelectrolyte and aging same.

2. A metering and wetting system for polyelectrolyte according to claim 1 wherein said air dryer assembly comprises: two desiccant chambers each containing a supply of regenerable beaded desiccant material and a heating element, each of said chambers having an opening to the atmosphere, blower means, valve means for connecting in one mode of operation the first chamber to the means for atomizing said powdered polyelectrolyte and the second chamber to the blower means and for connecting in a second mode of operation the second chamber to the means for atomizing said powdered polyelectrolyte and the first chamber to the blower means, and control means for controlling the mode of operation of said valve means in preselected timed sequence, whereby when one desiccant chamber is being utilized the other is being regenerated.

3. A metering and wetting system for polyelectrolyte according to claim 2 wherein said valve means is a four-way valve, and wherein said air dryer assembly further comprises filter means disposed between each of said desiccant chambers and the atmosphere.

4. A metering and wetting system for polyelectrolyte or the like comprising, in combination, volumetric feeder means for receiving powdered polyelectrolyte and conditioning and metering same, means for supplying a controlled quantity of compressed air, an air dryer assembly for predrying said compressed air, means for atomizing said powdered polyelectrolyte from said feeder means with said compressed air, means for supplying a controlled quantity of water, a mixing-wetting chamber for receiving said atomized powdered polyelectrolyte and said controlled quantity of water, means for flooding the internal surfaces of said mixing-wetting chamber with water and means for creating a cyclonic turbulence with the atomized powdered polyelectrolyte entering at the medial portion thereof to wet substantially all of the atomized particles of polyelectrolyte, and a mixing tank for receiving said so wetted polyelectrolyte and aging same.

5. A metering and wetting system for polyelectrolyte or the like, comprising a volumetric feeder having a bin for receiving powdered polyelectrolyte to be processed, a conditioning chamber for receiving polyelectrolyte from said bin, auger means mounted in said conditioning chamber, a discharge conduit connected to said conditioning chamber, means for rotating said auger means, a pneumatic conveyor line, means for supplying compressed air to said line, an air dryer assembly for predrying said compressed air said discharge conduit being connected to said conveyor line, control means for controlling the compressed air so that the powdered polyelectrolyte is atomized in said conveyor line, means for supplying a controlled quantity of water, a mixing-wetting chamber for receiving said atomized powdered polyelectrolyte and said controlled quantity of water and wetting substantially all of the atomized particles of polyelectrolyte, and a mixing tank for receiving said so wetted polyelectrolyte and aging same.

6. A metering and wetting system according to claim 5 wherein a tee is mounted in said conveyor line so that the two legs of said tee which form a straight line form a portion of said conveyor line, and the third leg of said tee being connected to said discharge conduit so that said polyelectrolyte to be processed enters said conveyor line at an angle of about 90° with respect to the flow of compressed air.

7. A metering and wetting system according to claim 5 wherein said mixing-wetting chamber is vertically disposed, said mixing-wetting chamber having an upper atomized dry product inlet for receiving said atomized product from said means for atomizing the powdered material, said mixing-wetting chamber having a water inlet entering at an angle of about 90° with respect to the atomized product inlet and directly adjacent thereto, means for supplying said controlled quantity of water to said water inlet, said mixing-wetting chamber having a lower outlet, whereby substantially all of the dry particles are wetted in said mixing-wetting chamber and dispensed through said lower outlet.

8. A metering and wetting system according to claim 7 wherein said mixing-wetting chamber is of upwardly, outwardly tapered conical configuration in the portion where said water contacts said atomized product and wherein said water inlet enters tangentially of said chamber.

9. A metering and wetting system according to claim 5 further comprising a mechanical low speed mixer mounted in said mixing tank to provide mechanical agitation, a second holding tank, piping means interconnecting said first tank with said second holding tank, pumping means connected to said holding tank for discharging the polyelectrolyte solution.

10. A metering and wetting system according to claim 5 further comprising a scrubber assembly mounted towards the top of said mixing tank and in operative communication with the upper portion thereof.

11. A metering and wetting according to claim 10 wherein said scrubber assembly comprises a housing having a blower whose draw is toward the upper end thereof, an inlet pipe extending from the bottom of said housing down into the upper portion of said mixing tank, and means for forming a water blanket towards the lower end of said inlet pipe.

12. A metering and wetting system according to claim 10 wherein said scrubber assembly comprises a housing having a blower suction draw on the upper end thereof, baffle means mounted in said housing, an inlet pipe extending from the bottom of said housing down into the upper portion of said mixing tank, screen means covering the bottom of the inlet pipe, and at least one tangentially oriented water inlet pipe mounted above said screen means to form a water blanket on the screen means.

13. A metering and wetting system for dry polyelectrolyte or the like, comprising a volumetric feeder having a bin for receiving powdered polyelectrolyte to be processed, a conditioning chamber for receiving polyelectrolyte from said bin, auger means mounted in said conditioning chamber, a discharge conduit connected to said conditioning chamber, means for rotating said auger means, a pneumatic conveyor line, means for supplying compressed air to said line, a tee mounted in said line and having one leg connected to said discharge conduit, control means for controlling the compressed air so that the powdered polyelectrolyte is atomized in said tee and conveyor line, a vertically mounted mixing-wetting chamber, said mixing-wetting chamber having an upper atomized product inlet for receiving said conveyor line, said mixing-wetting chamber having a water inlet entering at an angle of about 90° with respect to the atomized product inlet, means for supplying a controlled quantity of water to said water inlet, said mixing-wetting chamber having a lower outlet, whereby the flow of air and the flow of water coact in cyclonic fashion to wet substantially all of the particles of polyelectrolyte in said mixing-wetting chamber and dispense same through said outlet thereof, a first mixing-aging tank mounted under said mixing-wetting chamber, piping means interconnecting the outlet of said mixing-wetting chamber with said mixing-aging tank in fluid flow communication, a mechanical low speed mixer mounted in said mixing-aging tank to provide mechanical agitation, a second holding tank, piping means interconnecting said first tank with said second holding tank, pumping means connected to said second holding tank for discharging the polyelectrolyte solution.

14. A metering and wetting system for polyelectrolyte or the like, comprising a volumetric feeder having a bin for receiving powdered polyelectrolyte to be processed, a conditioning chamber for receiving polyelectrolyte from said bin, auger means mounted in said conditioning chamber, a discharge conduit connected to said conditioning chamber, means for rotating said auger means, a pneumatic conveyor line, means for supplying compressed air to said line, a tee mounted in said line and having one leg connected to said discharge conduit, control means for controlling the compressed air so that the powdered polyelectrolyte is atomized in said tee and conveyor line, a vertically mounted mixing-wetting chamber, said mixing-wetting chamber being of upwardly outwardly tapered configuration, said mixing-wetting chamber having an upper atomized product inlet for receiving said conveyor line, said mixing-wetting chamber having a tangentially oriented water inlet entering at an angle of about 90° with respect to the atomized product inlet and adjacent thereto, means for supplying a controlled quantity of water to said water inlet, said mixing-wetting chamber having a lower outlet, whereby the flow of air and the flow of water coact in cyclonic fashion to wet substantially all of the particles of polyelectrolyte in said mixing-wetting chamber and dispense same through said outlet thereof, a mixing-aging tank mounted under said mixing-wetting chamber, piping means interconnecting the outlet of the mixing-wetting chamber with said mixing-aging tank in fluid flow communication, a mechanical low speed mixer mounted in said mixing-aging tank to provide mechanical agitation, a scrubber assembly mounted on said mixing-aging tank having a housing including a blower with its suction toward the upper end thereof, baffle means mounted in said housing, an inlet pipe extending from the bottom of said housing down into the upper portion of said mixing-aging tank, screen means convering the bottom of the inlet pipe, and at least one tangentially oriented water inlet pipe mounted above said screen means to form a water blanket on the screen means.

15. A process for metering and wetting polyelectrolyte, comprising the steps of metering and conditioning powdered polyectrolyte, atomizing said powdered polyelectrolyte with a controlled quantity of compressed air, conveying said atomized polyelectrolyte to a mixing-wetting chamber, flooding the internal surfaces of said mixer-wetting chamber with water and creating a cyclonic turbulence with the atomized powder polyelectrolyte entering at the medial portion thereof to wet substantially all of the atomized particles of polyelectrolyte, and passing said wetted particles of polyelectrolyte to a mixing tank for aging and transferring said wetted polyelectrolyte into solution.

16. A process for metering and wetting powdered polyelectrolyte or the like, comprising the steps of passing said polyelectrolyte to be processed through a conditioning chamber having auger means rotating therein, controlling the rotation of said augers to meter and condition said polyelectrolyte, predrying a controlled quantity of compressed air, atomizing said powdered polyelectrolyte with said controlled quantity of compressed air, conveying said atomized polyelectrolyte to a mixing-wetting chamber, wetting substantially all of said atomized particles of polyelectrolyte with a controlled quantity of water in said mixing-wetting chamber, passing said wetted particles of polyelectrolyte to a mixing tank for aging and transferring said wetted polyelectrolyte into solution.

17. A process for metering and wetting polyelectrolyte or the like, comprising the steps of metering and conditioning powdered polyelectrolyte, predrying a controlled quantity of compressed air, atomizing said powdered polyelectrolyte with said controlled quantity of compressed air, conveying said atomized polyelectrolyte to a mixing-wetting chamber, wetting substantially all of said atomized particles of polyelectrolyte with a controlled quantity of water in said mixing-wetting chamber, passing said wetted particles of polyelectrolyte to a mixing tank for aging and transferring said wetted polyelectrolyte into solution, while simultaneously providing a negative air draw through said mixing-wetting chamber and through the upper portion of said mixing tank.

18. A process for metering and wetting polyelectrolyte or the like, comprising the steps of metering and conditioning powdered polyelectrolyte, predrying a controlled quantity of compressed air, atomizing said powdered polyelectrolyte with said controlled quantity of compressed air, conveying said atomized polyelectrolyte to a mixing-wetting chamber, wetting substantially all of said atomized particles of polyelectrolyte with a controlled quantity of water in said mixing-wetting chamber, passing said wetted particles of polyelectrolyte to a mixing tank, aging and transferring said wetted polyelectrolyte into solution in said mixing tank, withdrawing unwetted polyelectrolyte dust in a scrubber assembly mounted adjacent said mixing tank and wetting the withdrawn dust in said scrubber assembly and returning said so wetted particles to said mixing tank.

19. A process for metering and wetting polyelectrolyte or the like, comprising the steps of metering and conditioning powdered polyelectrolyte, atomizing said powdered polyelectrolyte with a controlled quantity of compressed air, conveying said atomized polyelectrolyte to a mixing-wetting chamber, wetting substantially all of said atomized particles of polyelectrolyte with a controlled quantity of water in said mixing-wetting chamber, passing said wetted particles of polyelectrolyte to a mixing tank, aging and transferring said wetted polyelectrolyte into solution in said mixing tank, withdrawing unwetted polyelectrolyte dust from the upper portion of said mixing tank, passing said dust through a water blanket at the bottom of a scrubber, while creating a negative air draw through said scrubber and through said upper portion of said mixing tank and through said mixing-wetting chamber.

20. A process for metering and wetting polyelectrolyte or the like, comprising the steps of metering and conditioning powdered polyelectrolyte, atomizing said powdered polyelectrolyte with a controlled quantity of compressed air, conveying said atomized polyelectrolyte to a mixing-wetting chamber, wetting substantially all of said atomized particles of polyelectrolyte with a controlled quantity of water in said mixing-wetting chamber, passing said wetted particles of polyelectrolyte to a mixing tank, aging and transferring said wetted polyelectrolyte into solution in said mixing tank, withdrawing unwetted polyelectrolyte dust from the upper portion of said mixing tank, passing said dust through screen means covered with a water blanket, creating a negative air draw at the upper end of said scrubber extending through said scrubber and through said upper portion of said mixing tank and through said wetting chamber, and subjecting the air flow between said water blanket and said blower to circuitous flow by baffle means.

21. A process for withdrawing polyelectrolyte dust from a tank having a scrubber assembly mounted thereon and including a housing having air draw toward the upper end thereof, baffle means mounted in said housing, an inlet pipe extending from the bottom of said housing down into the upper portion of said tank, screen means covering the bottom of the inlet pipe, at least one tangentially oriented water inlet pipe mounted above said screen means to form a water blanket on said screen means, said process comprising the steps of withdrawing unwetted polyelectrolyte dust from the upper portion of said tank, passing said dust through said screen means covered with the water blanket, creating a negative air draw by said blower at the upper end of said scrubber assembly, and subjecting the air flow between said water blanket and said blower to circuitous flow by said baffle means.

22. A process for metering and wetting polyelectrolyte or the like, comprising the steps of passing said polyelectrolyte to be processed through a conditioning chamber having auger means rotating therein, controlling the rotation of said auger means to meter and condition said polyelectrolyte, atomizing said powdered polyelectrolyte with a controlled quantity of compressed air by introducing the flow of the polyelectrolyte to enter a stream of said compressed air at an angle of about 90°, conveying said atomized polyelectrolyte to a mixing-wetting chamber, wetting substantially all of the particles of atomized polyelectrolyte with a controlled quantity of water entering at an angle of about 90° with respect to the atomized product inlet and substantially directly adjacent thereto in said mixing-wetting chamber, passing said so-wetted particles of polyelectrolyte to a mixing tank, and transferring said wetted polyelectrolyte into solution in said mixing tank with the aid of mechanical agitation.

23. A process for metering and wetting polyelectrolyte or the like, comprising the steps of passing said polyelectrolyte to be processed through a conditioning chamber having auger means rotating therein, controlling the rotation of said auger means to meter and condition said polyelectrolyte, metering and conditioning said polyelectrolyte in said volumetric feeder, introducing said polyelectrolyte into a pneumatic conveyor line at an angle of about 90° with respect to the flow in said line, atomizing said polyelectrolyte with a controlled quantity of compressed air, passing said atomized polyelectrolyte through said conveyor line to a mixing-wetting chamber, wetting substantially all of the particles of said atomized polyelectrolyte in said mixing-wetting chamber with water entering at an angle of about 90° with respect to the atomized product inlet, passing said wetted polyelectrolyte to a first mixing tank for aging from about 10 to about 50 minutes to transfer said polyelectrolyte into solution in said mixing tank with the aid of mechanical agitation, and transferring the completed solution of polyelectrolyte to a second holding tank for use.

24. A process for metering and wetting polyelectrolyte or the like, comprising the steps of feeding powdered polyelectrolyte into a volumetric feeder, metering and conditioning said polyelectrolyte in said volumetric feeder, introducing said polyelectrolyte into a pneumatic conveyor line at an angle of about 90° with respect to the flow in said line, atomizing said polyelectrolyte with a controlled quantity of compressed air, passing said atomized polyelectrolyte through said conveyor line to a mixing-wetting chamber, wetting substantially all of the particles of said atomized polyelectrolyte in said mixing-wetting chamber with water entering at an angle of about 90° with respect to the atomized product inlet, passing said wetted polyelectrolyte to a first mixing-aging tank, aging from about 10 to about 50 minutes to transfer said polyelectrolyte into solution in said mixing-aging tank with the aid of mechanical agitation, transferring the solution of polyelectrolyte to a second holding tank, withdrawing unwetted polyelectrolyte dust from the upper portion of said first mixing-aging tank into a scrubber assembly, wetting particles of polyelectrolyte in said scrubber assembly and returning the so wetted particles to said first mixing-aging tank, while simultaneously providing a negative air draw through said mixing-wetting chamber and the upper portion of said first mixing-aging tank and through said scrubber assembly.

\* \* \* \* \*

UNITED STATES PATENT AND TRADEMARK OFFICE
CERTIFICATE OF CORRECTION

PATENT NO. : 4,077,612
DATED : Mar. 7, 1978
INVENTOR(S) : Ronald J. Ricciardi

It is certified that error appears in the above-identified patent and that said Letters Patent are hereby corrected as shown below:

Claim 11, line 1, after "wetting" please insert --system--.

Signed and Sealed this

Eleventh Day of July 1978

[SEAL]

Attest:

RUTH C. MASON
Attesting Officer

DONALD W. BANNER
Commissioner of Patents and Trademarks